US012492106B2

(12) United States Patent
Janhäll et al.

(10) Patent No.: US 12,492,106 B2
(45) Date of Patent: Dec. 9, 2025

(54) WINCH ARRANGEMENT FOR A SAILING BOAT

(71) Applicant: Seldén Mast AB, Västra Frölunda (SE)

(72) Inventors: Nils Janhäll, Askim (SE); Mathias Lindström, Västra Frölunda (SE); Björn Adiels, Ytterby (SE)

(73) Assignee: SELDEN MAST AB, Västra Frölunda (SE)

( * ) Notice: Subject to any disclaimer, the term of this patent is extended or adjusted under 35 U.S.C. 154(b) by 188 days.

(21) Appl. No.: 18/036,918

(22) PCT Filed: Dec. 3, 2021

(86) PCT No.: PCT/SE2021/051202
§ 371 (c)(1),
(2) Date: May 15, 2023

(87) PCT Pub. No.: WO2022/154707
PCT Pub. Date: Jul. 21, 2022

(65) Prior Publication Data

US 2024/0002200 A1 Jan. 4, 2024

(30) Foreign Application Priority Data

Jan. 13, 2021 (SE) .................................. 2150020-2

(51) Int. Cl.
*B66D 1/74* (2006.01)

(52) U.S. Cl.
CPC ......... *B66D 1/7436* (2013.01); *B66D 1/7484* (2013.01)

(58) Field of Classification Search
CPC ................ B66D 1/7436; B66D 1/7484; Y10T 74/19172
See application file for complete search history.

(56) References Cited

U.S. PATENT DOCUMENTS 4,261,549 A * 4/1981 Bonassi ............... B66D 1/7494 254/297
4,437,621 A 3/1984 Sakumoto
(Continued)

FOREIGN PATENT DOCUMENTS

CN 204921926 12/2015
CN 108046147 5/2018
(Continued)

OTHER PUBLICATIONS

International Search Report issued in parent PCT/SE2022/050328, Jun. 29, 2022, pp. 1-4.
(Continued)

*Primary Examiner* — Anna M Momper
*Assistant Examiner* — Nathaniel L Adams
(74) *Attorney, Agent, or Firm* — Jeffrey S. Melcher; Melcher Patent Law PLLC

(57) ABSTRACT

The invention relates to a winding, particularly a winch, arrangement (100) comprising a two speed manually operable winding member (10) and a drive unit (20) comprising a motor (21). The drive unit (20) comprises a transmission arrangement connected to a motor shaft (25), an outgoing shaft (22) with an outer gear wheel (23). The transmission arrangement is adapted to allow the outgoing shaft gear wheel (23) rotate in the same direction but at different speeds depending on rotational direction of the motor (21). The manual winch (10) is adapted for reception of the outgoing shaft (22) allowing the winch drum (1) to be motor (21) driven. The drive unit (20) comprises means (67, 68) allowing engagement/disengagement of the outgoing shaft gear wheel (23) from the manually operable winding member (10) and the winding arrangement can be used as a two-speed manual or a two speed motor driven winding arrangement.

21 Claims, 13 Drawing Sheets

(56) References Cited

U.S. PATENT DOCUMENTS

| | | | | |
|---|---|---|---|---|
| 4,924,795 | A | 5/1990 | Ottemann | |
| 5,370,366 | A * | 12/1994 | Ottemann | B66D 1/7484 475/8 |
| 7,114,705 | B2 | 10/2006 | Steiner | |
| 7,226,042 | B2 | 6/2007 | Lewmar | |
| 9,061,870 | B2 * | 6/2015 | Fields | B66D 1/7431 |
| 2002/0092454 | A1 | 7/2002 | Meyerdierks | |
| 2005/0229739 | A1 | 10/2005 | Steiner | |
| 2015/0123057 | A1 * | 5/2015 | Ogden | B66D 1/12 254/362 |
| 2020/0277170 | A1 * | 9/2020 | Hausladen | B66D 5/26 |
| 2022/0371711 | A1 | 11/2022 | Janhall | |
| 2024/0002200 | A1 | 1/2024 | Jahnhall | |
| 2024/0182277 | A1 | 6/2024 | Lindstrom | |

FOREIGN PATENT DOCUMENTS

| | | |
|---|---|---|
| CN | 210686874 | 6/2020 |
| DE | 21 02 790 | 8/1972 |
| DE | 42 32 329 | 3/1994 |
| EP | 1 582 297 | 10/2005 |
| GB | 1 371 994 | 10/1974 |
| GB | 2276137 | 9/1994 |
| WO | 2008/119108 | 10/2008 |
| WO | 2010090524 | 8/2010 |
| WO | 2011/049443 | 4/2011 |
| WO | 2021/096404 | 11/2019 |
| WO | 2022/154707 | 7/2022 |
| WO | 2024076278 | 4/2024 |

OTHER PUBLICATIONS

Written Opinion issued in parent PCT/SE2022/050328, Jun. 29, 2022, pp. 1-5.

International Search Report issued in parent PCT/SE2021/051202, Feb. 25, 2022, pp. 1-2.

Written Opinion issued in parent PCT/SE2021/051202, Feb. 25, 2022, pp. 1-6.

International Search Report issued in parent PCT/SE2020/050880, Jan. 25, 2021, pp. 1-2.

Written Opinion issued in parent PCT/SE2020/050880, Jan. 25, 2021, pp. 1-12.

International Search Report issued in parent PCT/SE2023/050932, May 1, 2024, pp. 1-2.

Written Opinion issued in parent PCT/SE2023/050932, May 1, 2024, pp. 1-10.

* cited by examiner

WINCH ARRANGEMENT FOR A SAILING BOAT

TECHNICAL FIELD

The present invention relates to a winding arrangement for a sailing boat having the features of the first part of claim 1, and in particular to a winch arrangement.

BACKGROUND

Sails that are used on a sailing boat may e.g. comprise a mainsail, spinnaker, jib, headsail, and genoa. The sails are supported by one or more masts, a vertical pole or spar that extends upward from the boat. The mainsail is also supported by a boom attached to the mast to support the bottom part of the mainsail. The sails are attached to lines or wires holding them in place and applying tension to the sails and supporting e.g. the mast. The lines, or wires, are denoted differently depending on location and function or attachment such as headstay, backstay, shrouds, sheets, halyards, etc.

In order to be able to sheet in large sails with a winch, particularly in strong winds, a high drum speed of the winch is needed to allow sheeting large sails in a short time, and also a high torque is required to allow tensioning of the sail when the wind is strong. A sailboat winch thus needs to provide a high drum speed (at a low drum torque) as well as a high drum torque (at a low speed). Manual sailboat winches with a winch handle are therefore often configured as 2-speed winches where the winch drum always rotates in the same direction, but with different speeds and torques depending on whether the winch handle is rotated clockwise or anti-clockwise.

Such winches additionally equipped with an electric drive unit comprising motor and gear are also known. The drive unit is then generally connected to the same shaft as the winch handle to provide access to the same 2-speed gear functionality. This allows the use of an electric drive unit of moderate maximum torque and maximum speed. A serious drawback associated with such solutions is that, if a winch handle is connected at the same time as the electric drive unit is activated, running, the handle will turn, which may result in accidents and injuries. To solve this problem, winch arrangements, which can be manually driven as well as driven by a drive unit, have been provided wherein the drive unit is connected to the winch gear transmission at an alternative position. Then there will however only be one speed, a 1-speed gear, which is disadvantageous since the electric motor has a low performance at low speeds. In order to compensate for these disadvantages, solutions comprising an oversized electric motor and oversized related electric installations have been suggested. The use of oversized electric installations, thick cables and a large electric motor is however not convenient on a sailing boat where space is limited, and with a large electric motor the current consumption is high, which also is a disadvantage, in particular on a sailing boat.

Thus, all known winch arrangements as discussed above suffer from considerable drawbacks and so far, there are no satisfactory solutions.

The problems are similar for other winding arrangements on a sailing boat.

SUMMARY OF THE INVENTION

It is therefore an object of the present invention to provide a solution to one or more of the above-mentioned problems.

It is a particular object to provide an improved winding arrangement, in particular an improved winch arrangement. It is particularly an object to provide a winding arrangement, in particular a winch arrangement, which can handle high torques and high speeds. It is a particular object to provide a winding arrangement which also is small and compact. Another object is to provide a winding arrangement allowing manual as well as motor driven, particularly electrical, operation which is safe to operate in manual as well as motor (e.g. electric) driven mode.

It is also a particular object to provide a winding arrangement operable in manual mode as well as in motor driven mode wherein the motor performance is high for high as well as low speeds.

It is also a particular object to provide a winding arrangement which is easy and safe to operate. Another particular object is to provide a winding arrangement which has a high performance in a motor driven state.

Still another object is to provide a winding arrangement through which a small motor pack, particularly with a lower power consumption, can be used.

Yet a particular object is to provide a solution through which there is no need for an over dimensioned motor pack.

Other objects are to provide a winding, particularly a winch, arrangement which is easy to install and operate, which demands less space than hitherto known solutions, which furthermore is easy to use and control, and flexible as far as installation is concerned, and which in addition thereto is cheap and can be installed and run at a low cost. It is also an object to provide a winding arrangement as initially referred to which is reliable and safe, in situations with high as well as low external torque loads, and which also provides a high winding drum speed.

Therefore, a winding arrangement as initially referred to is provided which comprises the characteristic features of the characterizing part of claim 1.

Advantageous embodiments are given by the appended dependent claims.

BRIEF DESCRIPTION OF THE DRAWINGS

The invention will in the following be further described, in a non-limiting manner, and with reference to the accompanying drawings, in which.

DETAILED DESCRIPTION

Figure 1:
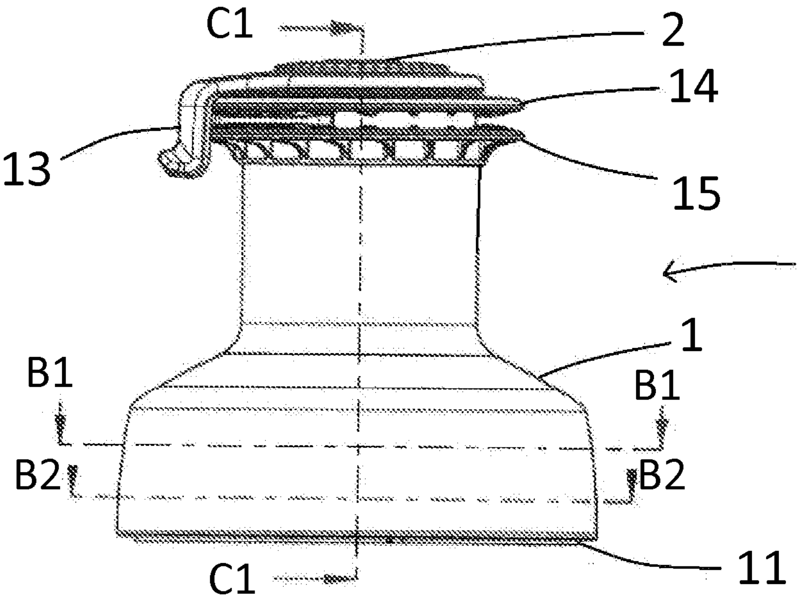
FIG. 1 is a schematic side view of a manual 2-speed winch.

FIG. 1 shows an example of a manual two speed winch 10 for mounting on a sailing boat. The manual two speed winch 10 comprises a support 11 for mounting on the sailing boat, a rotatably, with respect to the support 11, mounted winch drum 1 allowing a line (not shown) to be wound around it in a manner known per se. From an upper driving opening comprising a socket 4 for a driving device, e.g. comprising a crank with a crank handle, a winch handle, different kinds of which are known and which will therefore not be further described, a center or driving shaft 2 (see also e.g. FIG. 1C) extends into the winch drum 1 for driving a transmission mechanism housed in the support 11. The center shaft 2 is rotatable with respect to the winch drum 1 and with respect to the support 11. The exemplary manual winch 10 shown in FIG. 1 comprises a self-tailing arrangement disposed at the upper end of the winch 10 and which here e.g. comprises a feeder arm 13, an upper crown 14, a lower crown 15 and line stripper in a manner known per se. It should be clear that the present invention is not limited to a winch comprising a self-tailing arrangement of any kind. In alternative embodiments the manual winch does not comprise any self-tailing arrangement, and the inventive concept is also not limited to comprise a manual winch as shown and described with reference to the in FIG. 1 illustrated embodiment; on the contrary it may be of different kinds and be varied in a number of different manners, and may alternatively comprise a winding member of any winding arrangement such as a furler unit for a sail, a windlass or a captive reel winch, i.e. the inventive concept is applicable for many other winding arrangements on a sailing boat where a high torque at low speed and a low torque at high speed is desired.

Figure 1A:
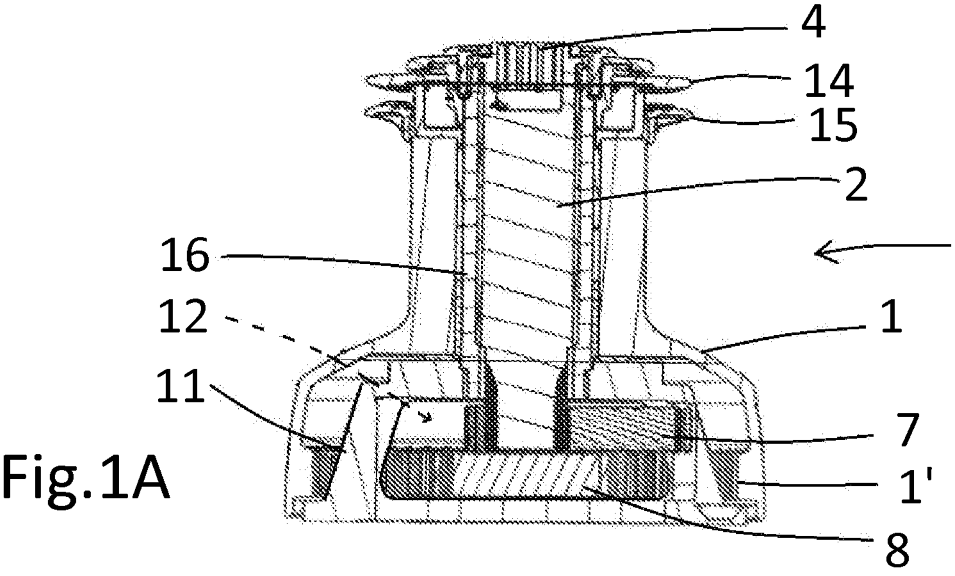
FIG. 1A is a schematic cross-sectional view taken along the section C1-C1 in FIG. 1.

FIG. 1A is cross-sectional view through the manual winch 10 along the section C1-C1 in FIG. 1, schematically illustrating winch drum 1, winch drum gear teeth 1', support (winch base) 11, center shaft 2, second (manual) gear 7 and third (manual) gear 8 of winch transmission mechanism 12; other elements which have already been discussed with reference to FIG. 1 will not be further discussed here.

Figure 1B:
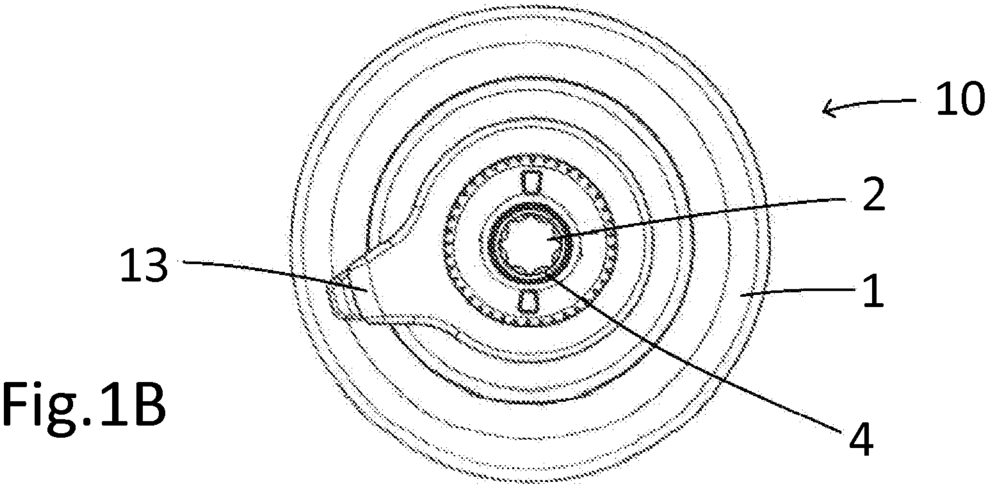
FIG. 1B is a schematic top view of the manual 2-speed winch shown in FIG. 1.

FIG. 1B is a top view of the manual winch 10 of FIG. 1 showing the winch drum 1, the socket 4 for reception of the center shaft, and the (optional) feeder arm 13.

The functioning of the transmission mechanism 12 of the manual winch 10 when the winch handle or the crank is turning clockwise and anti-clockwise respectively, as well as when the winch handle is released and there is a clockwise and an anti-clockwise torque respectively on the winch drum 1, is schematically illustrated with reference to FIGS. 1C-1J.

Figure 1C:
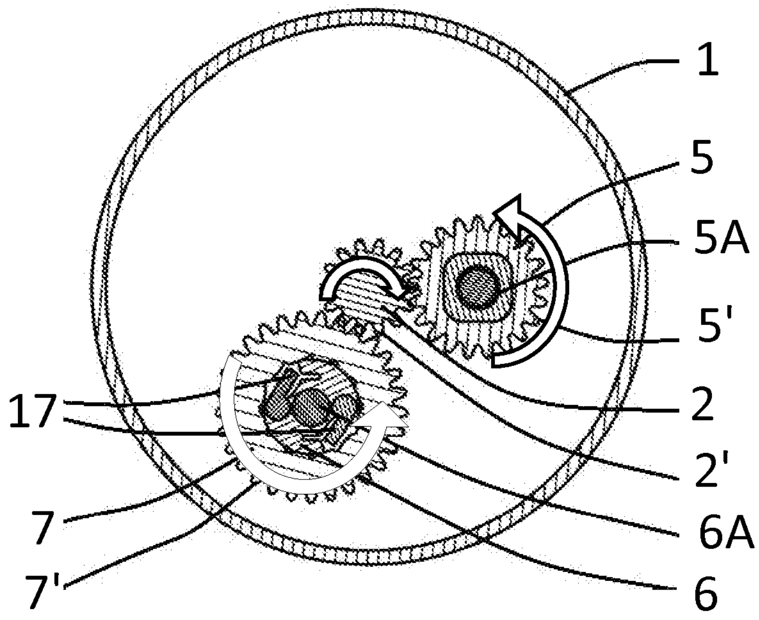
FIG. 1C is a schematic cross-sectional view taken along the section B1-B1 in FIG. 1 when the winch handle is turning clockwise.

FIG. 1C is schematic illustration of the functioning of the transmission mechanism 12 as seen in the section B1-B1 in FIG. 1 in a first case when the winch handle or the crank (not shown) is turning in a first rotational direction, here e.g. clockwise. The center shaft 2 will then rotate in the first rotational direction, here clockwise, with the winch crank or the winch handle and will get into engagement with the first gear 5 and the gear 7 of the transmission mechanism 12, in the following also denoted first and second manual gears 5, 7, by external center shaft teeth 2' meshing with external teeth 5' of the first manual gear 5 tooth wheel and with external teeth 7' of the second manual gear 7 tooth wheel. The first and second manual gears 5, 7 will then both rotate in a second rotational direction, here anti-clockwise, and transmission shaft 6 will get into engagement with the second manual gear 7 due to a one-way locking mechanism, here comprising ratchet pawls 17 pivotally arranged on the outer periphery of an output sleeve of the transmission or driving shaft 6 and which can pivot between a released position and an engaged position in which their free ends engage with internal ratchet teeth or ratchet pawl locking seats of the second gear 7. Transmission shaft gear 6 will hence also rotate in the second direction, here anti-clockwise.

Figure 1D:
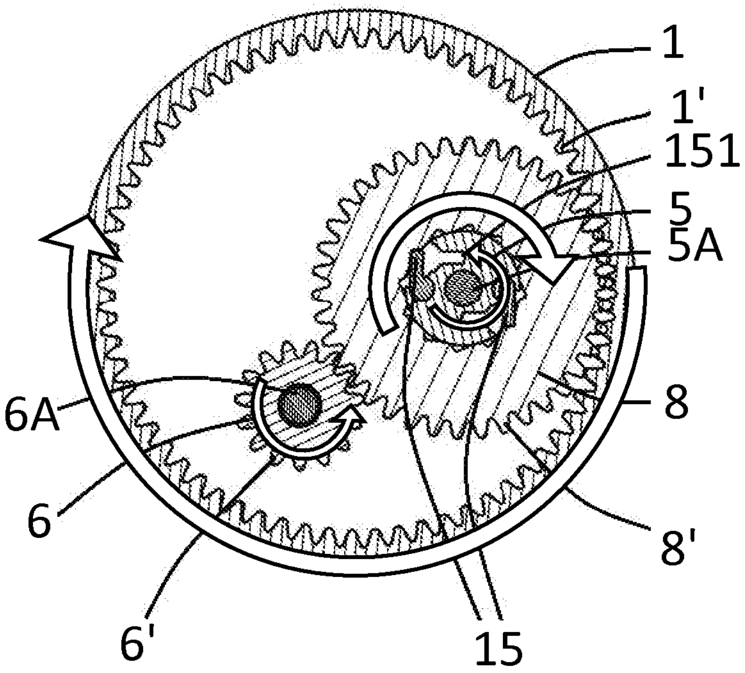
FIG. 1D is a schematic cross-sectional view taken along the section B2-B2 in FIG. 1 when the winch handle is turning clockwise.
Figure 1E:
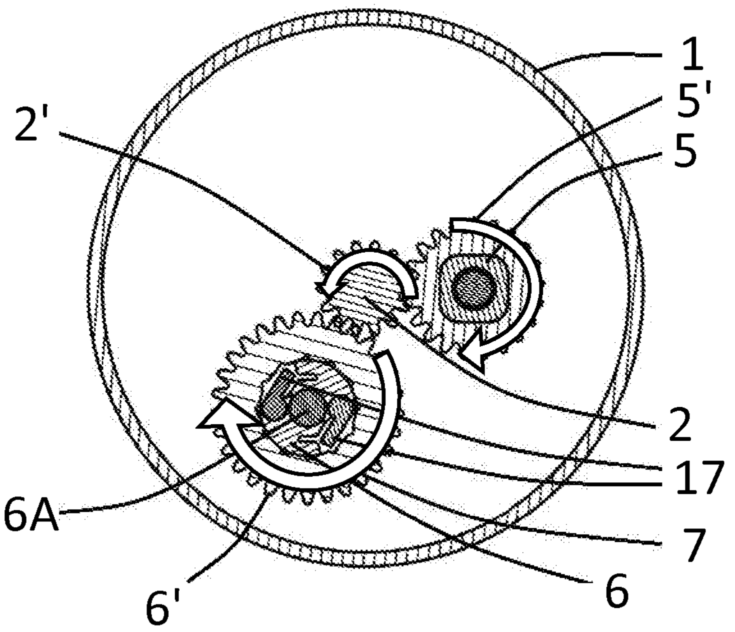
FIG. 1E is a schematic cross-sectional view taken along the section B1-B1 in FIG. 1 when the winch handle is turning anti-clockwise.

FIG. 1D illustrates the functioning of the transmission mechanism 12 in the section B2-B2 in FIG. 1 in the first case when the winch handle or the crank is turning in the first rotational direction, here clockwise. As described with reference to FIG. 1C, the first manual gear 5 and the transmission shaft gear 6 rotate in the second rotational direction, here anti-clockwise. External gear teeth of a third gear 8 of the transmission mechanism 12, in the following also denoted third manual gear 8, will engage with external teeth 6' of transmission shaft gear 6. The third manual gear 8 will not engage with the first manual gear 5 due to a second one-way locking mechanism, e.g. a ratchet mechanism with pivotally mounted ratchet pawls 15 disposed on the outer of the first manual gear being disengaged from internal ratchet teeth or ratchet pawl locking seats on the inner of the third manual gear 8 which is coaxial with and surrounds the first manual gear 5. The third manual gear 8 will hence rotate in the first rotational direction, here clockwise. Winch drum gear teeth 1' on the inner part of the winch drum 1 will mesh with the external teeth 8' of the third gear 8 and the winch drum 1 will hence also rotate in the first rotational direction, here clockwise. FIG. 1E is a schematic illustration of the functioning of the transmission mechanism 12 as seen in the section B1-B1 in FIG. 1 in a second scenario in which the winch handle or the crank is turning in a second rotational direction, here anti-clockwise. The center shaft 2 will then also rotate in the second rotational direction, here anti-clockwise, with the winch handle or the crank, and outer gear teeth 2' of the center shaft 2 will get into engagement with the outer gear teeth 5' of the first manual gear 5 and with the outer gear teeth 7' of the second manual gear 7 respectively. The first and second manual gears 5, 7 will then both rotate in a first rotational direction, here clockwise. Transmission shaft gear 6 will slip within the second manual gear 7, not engage, and hence not rotate due to the first one-way locking mechanism, here comprising ratchet pawls 17 which are in a disengaged position, not engaging with internal ratchet teeth or ratchet pawl locking seats on the inner wall of the second manual gear 7.

Figure 1F:
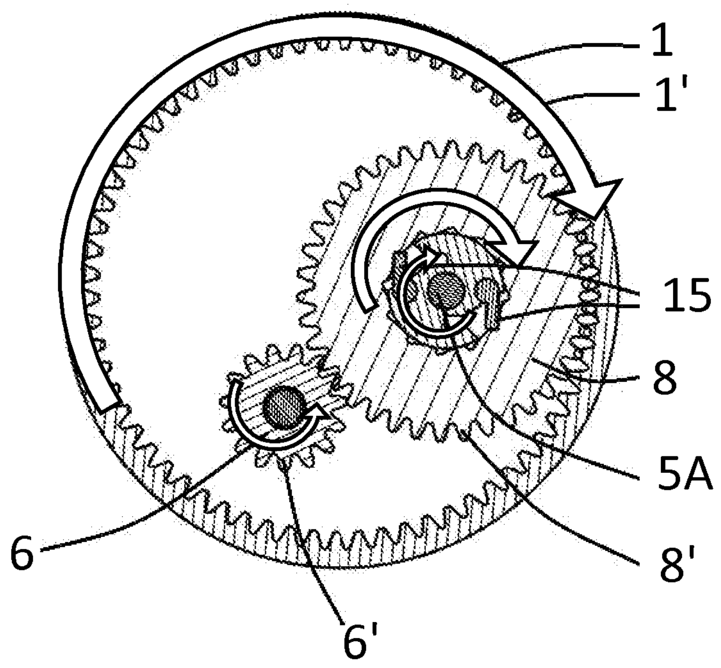
FIG. 1F is a schematic cross-sectional view taken along the section B2-B2 in FIG. 1 when the winch handle is turning anti-clockwise.

FIG. 1F illustrates the functioning of the transmission mechanism 12 in the section B2-B2 in FIG. 1 in the second scenario when the winch handle or the crank is turning in the second rotational direction, here anti-clockwise. As described with reference to FIG. 1E, the first manual gear 5 rotates in the first rotational direction, clockwise. The third manual gear 8 will engage with the first manual gear 5 by means of the ratchet pawls 15 of the second one-way locking mechanism engaging with inner ratchet teeth or ratchet pawl locking seats on the inner wall of the third manual gear 8 and the third manual gear 8 will hence also rotate in the first rotational direction, clockwise. The winch drum inner gear wheel with inner gear teeth 1' on the inner wall of the winch drum 1 will mesh with external teeth 8' of the third gear 8 and will hence also rotate in the first rotational direction, here clockwise.

Figure 1G:
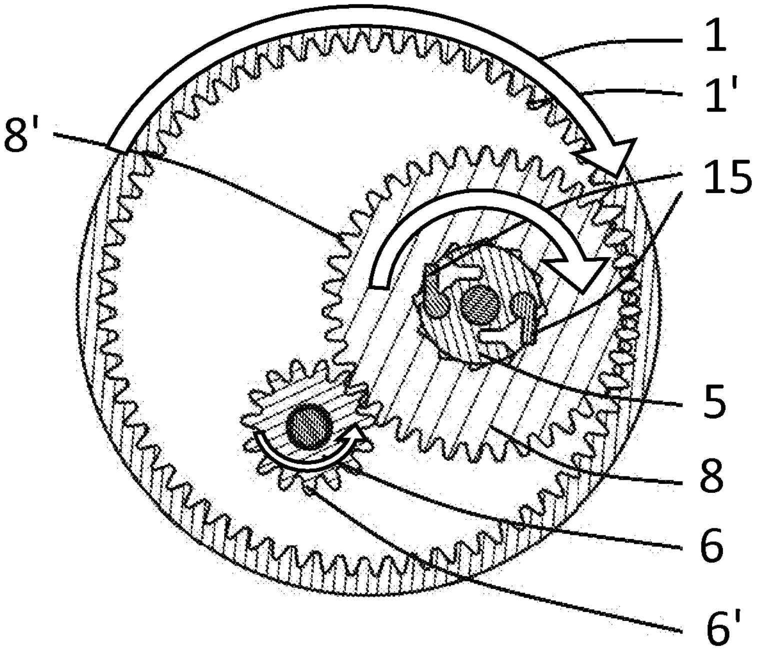
FIG. 1G is a schematic cross-sectional view taken along the section B2-B2 in FIG. 1 when the winch drum is exposed to a clockwise torque, and the winch handle is released.

FIG. 1G is schematic illustration of the functioning of the transmission mechanism 12 as seen in the section B2-B2 in FIG. 1 in a third scenario in which there is a torque in the first rotational direction, here clockwise, on the winch drum 1 and the winch handle or the crank handle is released, e.g. line is pulled. The inner teeth 1' of the winch drum 1 and the outer teeth 8' of the third manual gear 8 are in engagement and the winch drum 1 and the third manual gear 8 will rotate in the first rotational direction, here clockwise. The outer teeth 8' of the third gear 8 will also mesh with the outer teeth 6 of the transmission shaft gear 6, and the transmission shaft gear 6 will rotate in the second rotational direction, anti-clockwise. The first manual gear 5 is disengaged from the third manual gear 8 by means of the ratchet pawls 15 of the second one-way locking mechanism being disengaged from the inner ratchet teeth or ratchet pawl locking seats on the inner wall of the third manual gear 8 and will hence not rotate.

Figure 1H:
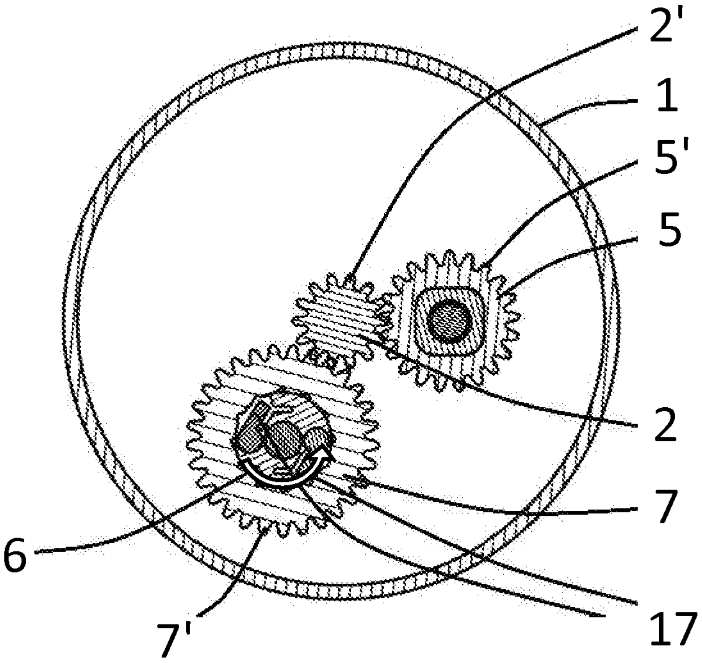
FIG. 1H is a schematic cross-sectional view taken along the section B1-B1 in FIG. 1 when the winch drum is exposed to a clockwise torque, and the winch handle is released.

FIG. 1H illustrates the functioning of the transmission mechanism 12 in the section B1-B1 in FIG. 1 in the third scenario in which there is a torque in the first rotational direction, here clockwise, on the winch drum 1 and the winch handle or the crank handle is released. The transmission shaft gear 6 will turn in the second rotational direction, anti-clockwise, and the second manual gear 7 is released from the transmission shaft gear 6 by means of the ratchet pawls 17 of the first one-way locking mechanism being disengaged from the inner ratchet teeth or ratchet pawl locking seats on the inner wall of the second gear 7 and will hence not rotate. The center shaft 2 will thus also not rotate.

Figure 1I:
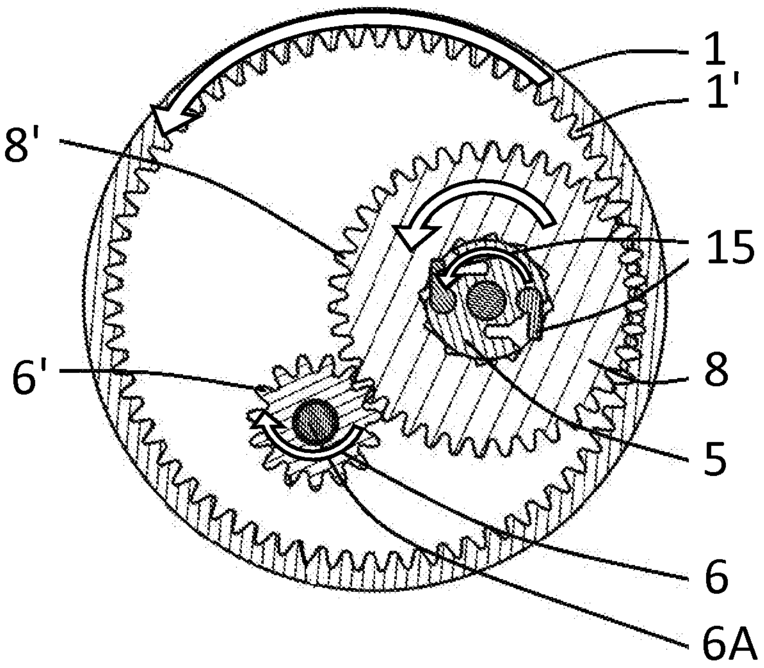
FIG. 1I is a schematic cross-sectional view taken along the section B2-B2 in FIG. 1 when the winch drum is exposed to an anti-clockwise torque, and the winch handle is released.

FIG. 1I is schematic illustration of the functioning of the transmission mechanism 12 as seen in the section B2-B2 in FIG. 1 in a fourth scenario in which a torque is applied in the second rotational direction, here anti-clockwise, on the winch drum 1 and the winch handle or the crank is released. The inner teeth 1' of the winch drum 1 and the outer teeth 8' of the third manual gear 8 are in engagement and the winch drum 1 and the third manual gear 8 will rotate in the second rotational direction, anti-clockwise. The outer teeth 8' of the third manual gear 8 will also mesh with the outer teeth 6' of the transmission shaft gear 6, and the transmission shaft gear 6 will rotate in the first rotational direction, clockwise. Transmission shaft 6A is fixed and does not rotate. The first manual gear 5 is here engaged with the third manual gear 8 by means of the ratchet pawls 15 of the second one-way locking mechanism engaging with inner ratchet teeth or ratchet pawl locking seats on the inner wall of the third manual gear 8 and the first manual gear 5 will hence also rotate in the second rotational direction, anti-clockwise.

Figure 1J:
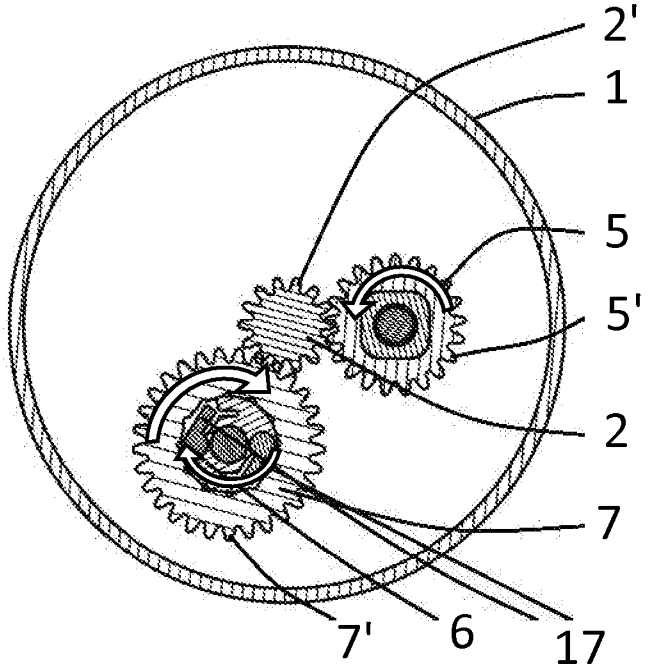
FIG. 1J is a schematic cross-sectional view taken along the section B1-B1 in FIG. 1 when the winch drum is exposed to an anti-clockwise torque, and the winch handle is released.

FIG. 1J illustrates the functioning of the transmission 12 mechanism in the section B1-B1 in FIG. 1 in the fourth scenario in which there is a torque in the second rotational direction, anti-clockwise, on the winch drum 1 and the winch handle or the crank is released. The transmission shaft gear 6 turns in the first rotational direction, clockwise, and the second manual gear 7 is engaged with the transmission shaft gear 6 by means of the ratchet pawls 17 of the first one-way locking mechanism engaging with inner ratchet teeth or ratchet pawl locking seats on the inner wall of the second manual gear 7, and will also rotate clockwise. The center shaft 2 will be subjected to counteracting forces from the first manual gear 5 and the second manual gear 7 by the external teeth 2' of the center shaft 2 meshing with the external teeth 5' of the first manual gear 5 as well as with the external teeth 7' of the second manual gear 7. The transmission mechanism 12 is locked and the winch drum 1 cannot rotate.

Figure 2:
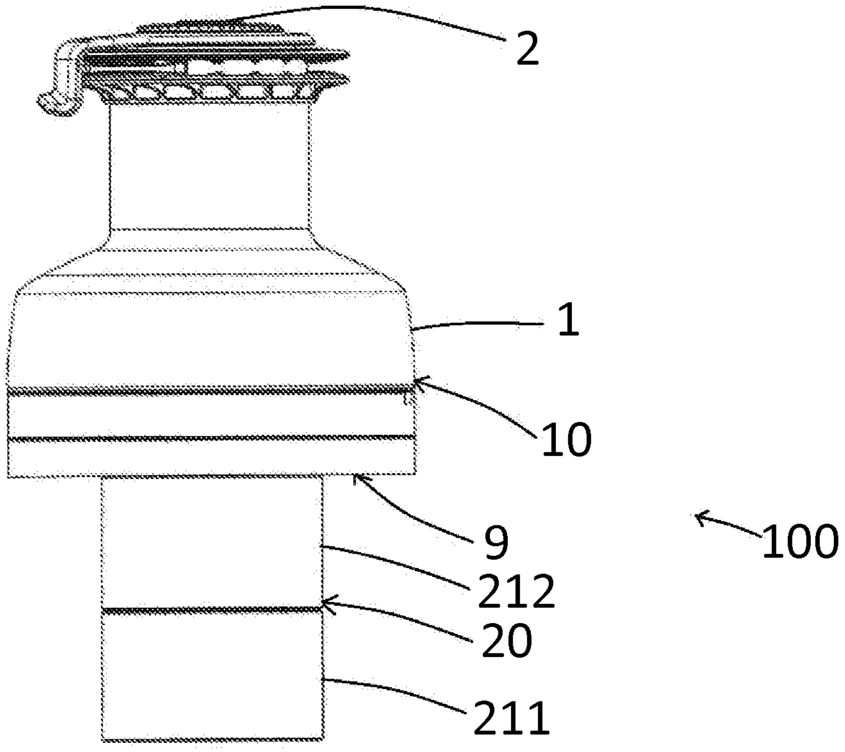
FIG. 2 is a side schematic side view of a winch arrangement comprising a manual winch and an electric 2-speed drive unit according to one embodiment of the present invention.

An exemplary winch arrangement 100 according to one embodiment of the present invention is shown in FIG. 2. The winch arrangement 100 comprises a manual two-speed winch 10 e.g. as described with reference to FIGS. 1-1J with a shaft hole 122 (see FIG. 3) accessible from the bottom portion 9 of the manual winch 10 for reception of an outgoing shaft 22 (see FIG. 4) of an electric drive unit 20 comprising an electric motor 21 arranged in a motor housing 211 and an upper, gearbox or transmission housing 212.

Figure 3:
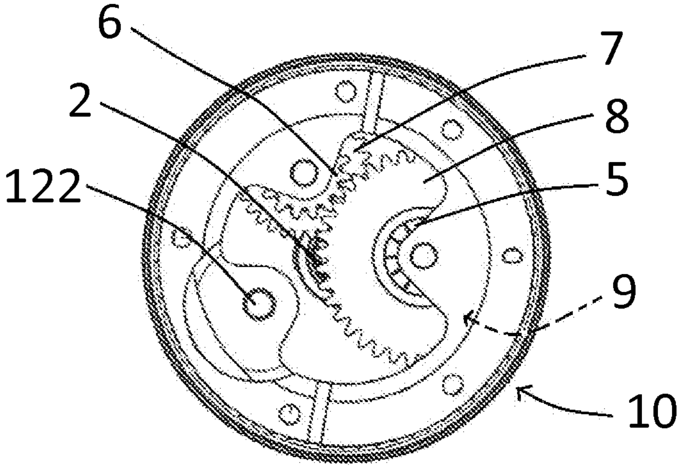
FIG. 3 is a bottom view of the manual winch of the winch arrangement of FIG. 2.

FIG. 3 is a bottom view of the manual winch 10 showing the bottom 9 with the shaft hole 122, and schematically indicating the center shaft 2, the first manual gear 5, the manual third gear 8, the second manual gear 7 and the transmission gear 6.

Figure 4:
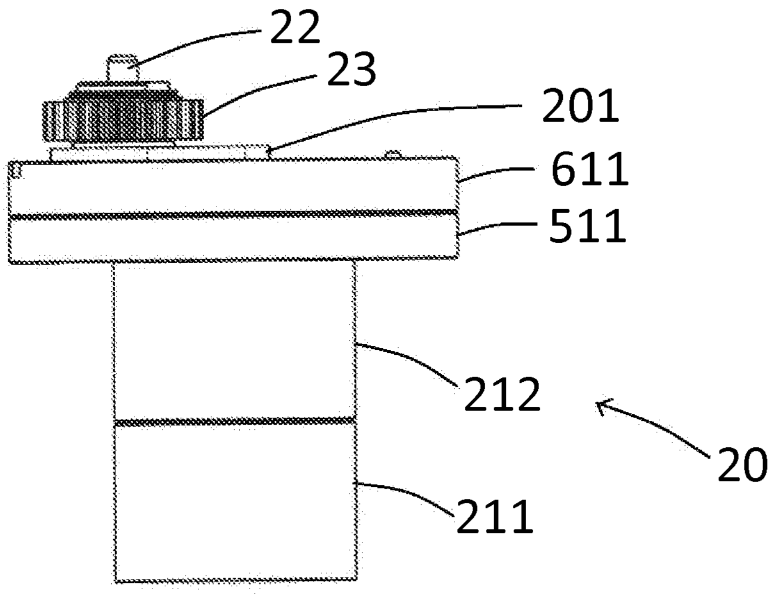
FIG. 4 is a schematic side view of the electric drive unit of winch arrangement shown in FIG. 2.

FIG. 4 is a side view of the electric drive unit 20 comprising a motor housing 211 for an electric motor 21 (see FIG. 4B) and a transmission housing 212 for, here, a three stage planetary gear box comprising three planetary gear stages 24, 31, 41 (FIG. 4B) as will be described below and a two-speed torque hub 60 upper part housing 511 and a spur gear coupling housing 611. The electric drive unit 20 comprises an outgoing shaft 22 with an outgoing, also called output, shaft gear wheel 23 which, when arranged or fitted on the manual winch 10, is, here, arranged to engage with the gear wheel of the third manual gear 8 of the manual winch 10 when the outgoing shaft 22 of the electric drive unit 20 is received in the hole 122 at the bottom 9 of the manual winch 10, and hence allowing the electric motor 21 to drive the winch drum 1. In alternative, not shown, embodiments, the outgoing shaft gear wheel 23 is connected to transmission shaft gear 6 or to the winch drum inner gear ring with inner gear teeth 1', i.e. indirectly connected to the third manual gear 8 (or more generally to a manual gear wheel of the transmission mechanism 12 of the manual winch 10. Thus, instead of being directly connected to the third manual gear 8, the outgoing shaft gear wheel 23 may e.g. be connected to any one of the transmission shaft gear 6 or to the winch drum inner gear ring with inner gear teeth 1' which are directly connected to the third manual gear 8. However, in such embodiments, to compensate the resulting rotation direction of the winch drum 1, the rotation direction of the motor 21 needs to be changed and one-way locking mechanisms 56, 58 and 57, 59 (cf. FIGS. 5E, 6A below), and 67, 68 (cf. FIGS. 5G, 6C below) need to change their locking directions, i.e. different from the embodiments described with reference to FIGS. 5E-5G; 6A-6C).

Figure 4A:
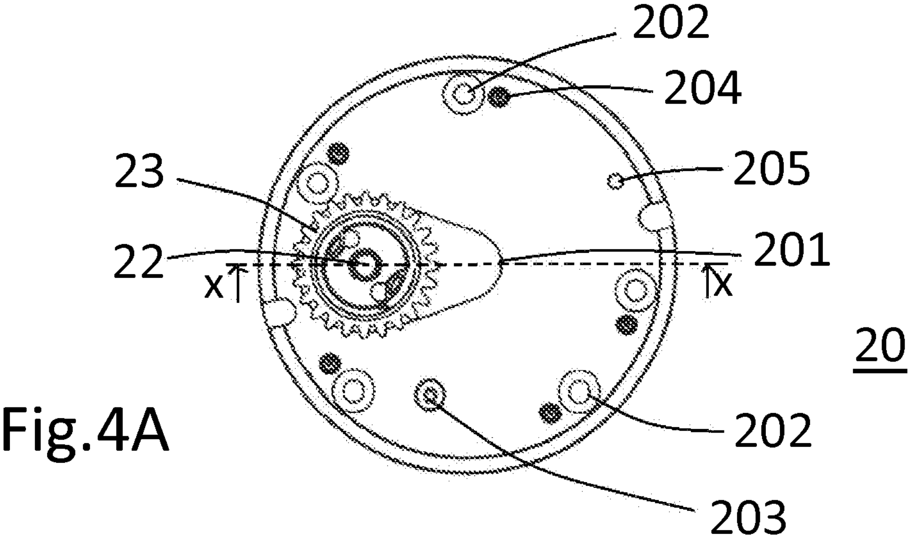
FIG. 4A is a schematic top view of the electric drive unit of winch arrangement shown in FIG. 4.

FIG. 4A is a top view of the electric drive unit 20 showing the outgoing shaft 22 with the electric drive unit outgoing shaft gear wheel 23. Reference numerals 201-205 very schematically illustrate constructional details comprising a, for the inventive concept not relevant, spur gear coupling housing detail 201, screw holes 202 for securing the electric motor 21 to a sailing boat (not shown), screws 203 for joining two-speed torque hub 60 upper part housing 511 and spur gear coupling housing 611, and screw holes 204 for screws for mounting the manual winch 10 to the electric drive unit 20, which will not be further described herein since they are not of relevance for the functioning of the inventive concept and relate to conventional securing means etc. which can be replaced or varied through similar, known, means disposed at other locations and in any other number.

Figure 4B:
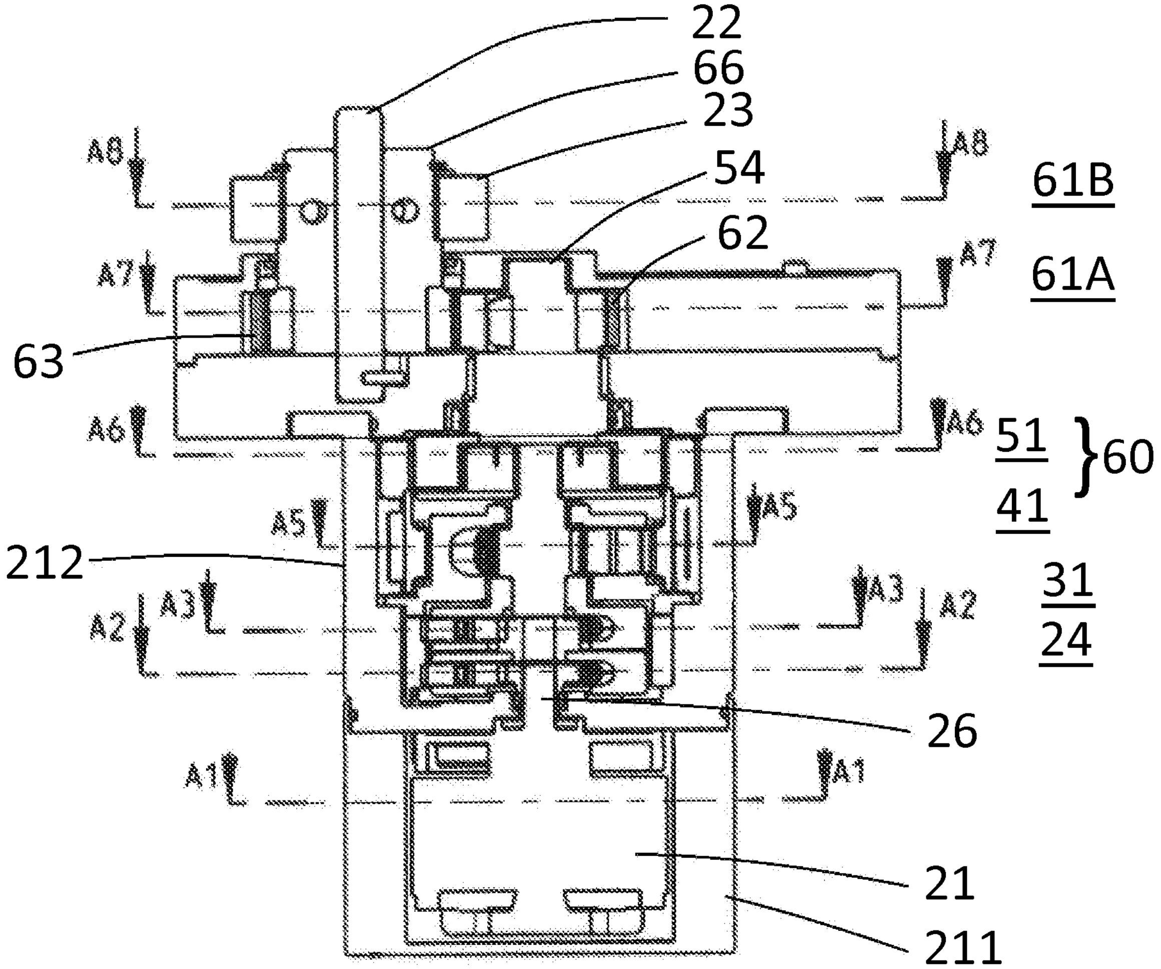
FIG. 4B is a cross-sectional view through electric drive unit taken along the section X-X in FIG. 4A.
Figure 5A:
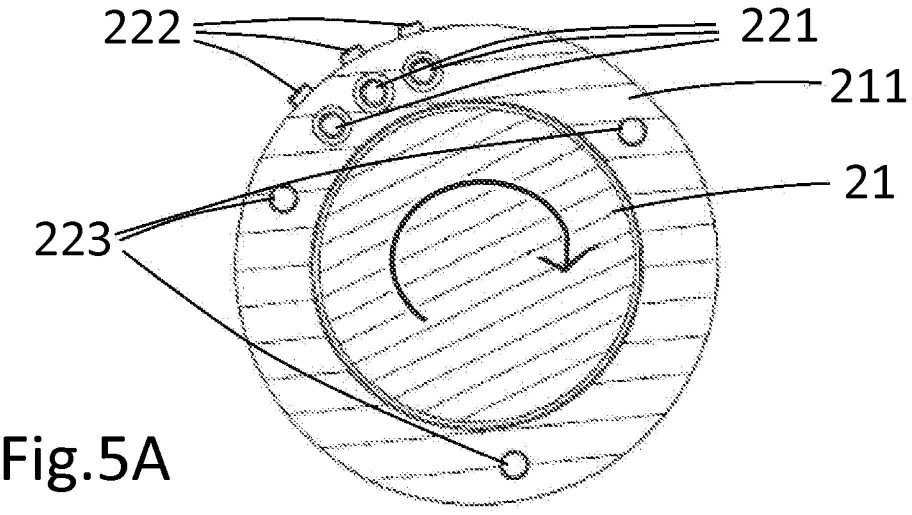
FIG. 5A is a schematic cross-sectional view taken along the section A1-A1 in FIG. 4B when the motor is turning clockwise.
Figure 5B:
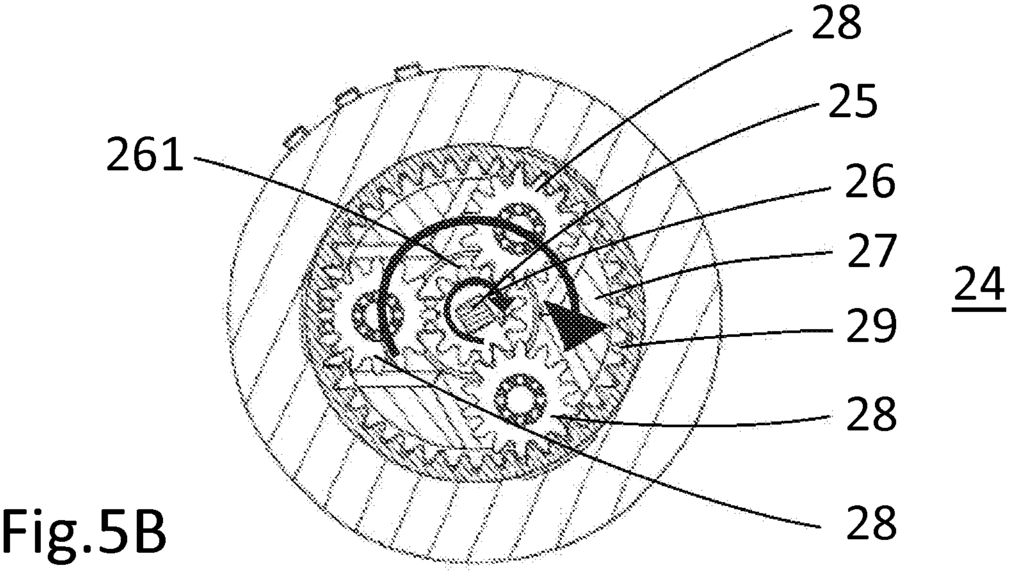
FIG. 5B is a schematic cross-sectional view taken along the section A2-A2 in FIG. 4B, showing a first planetary gear stage of a three-stage planetary gear box, when the motor is turning clockwise.
Figure 5C:
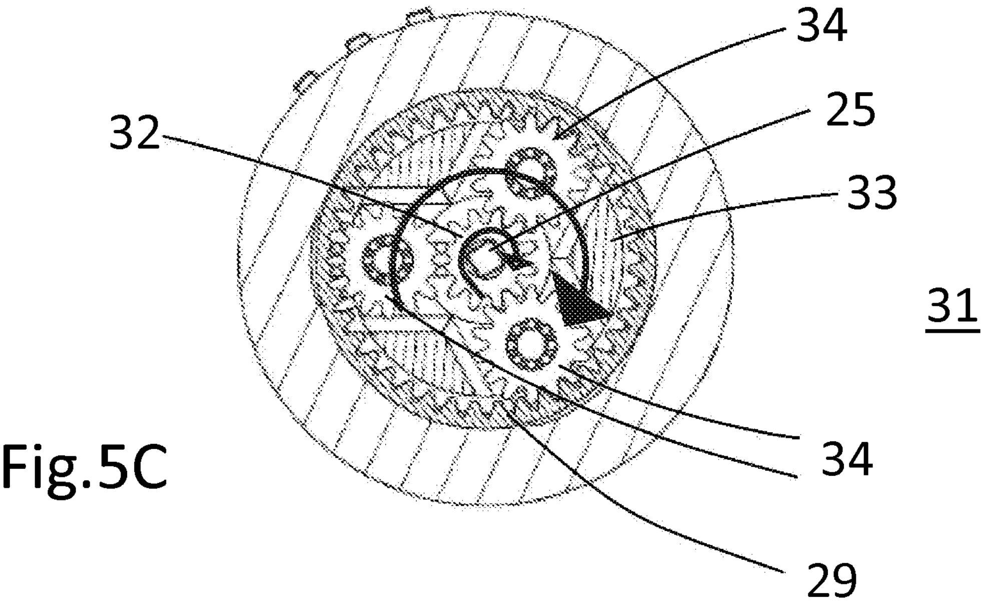
FIG. 5C is a schematic cross-sectional view taken along the section A3-A3 in FIG. 4B, showing a second planetary gear stage of the three-stage planetary gear box, when the motor is turning clockwise.
Figure 5D:
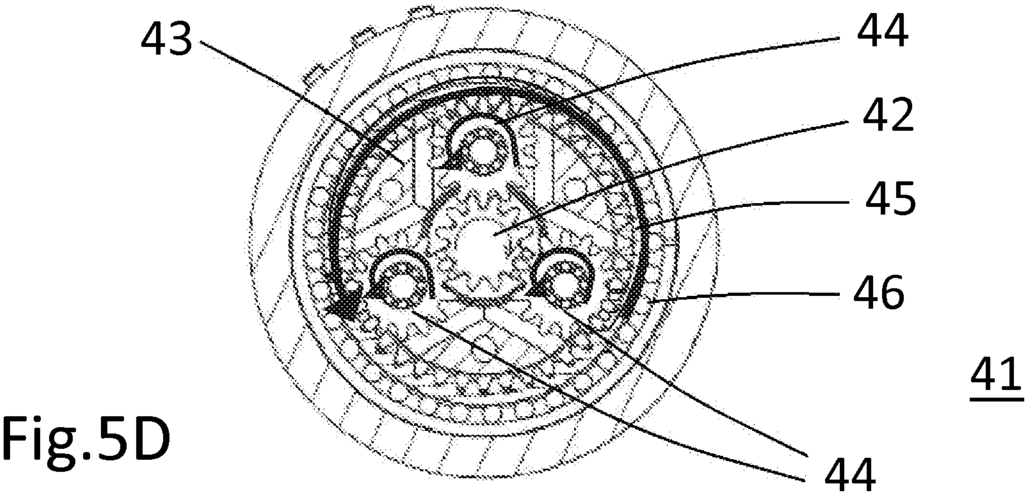
FIG. 5D is a schematic cross-sectional view taken along the section A5-A5 in FIG. 4B, showing a third planetary gear stage comprising a fixed planetary carrier, with a sun gear forming an ingoing shaft of a 2-speed torque hub, when the motor is turning clockwise.
Figure 5E:
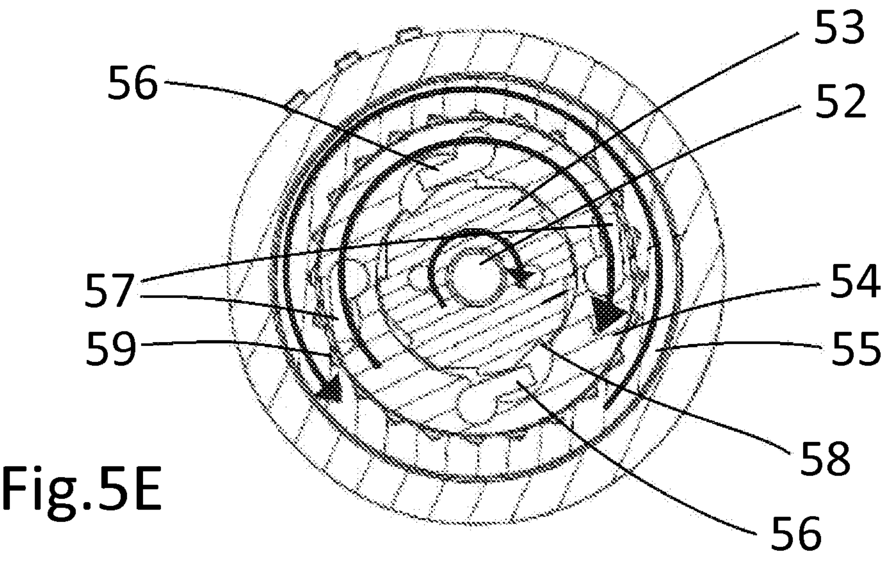
FIG. 5E is a schematic cross-sectional view taken along the section A6-A6 in FIG. 4B, showing a 2-way ratchet mechanism with a mid-wheel (intermediate ring) forming an outgoing shaft of the two-speed torque hub, when the motor is turning clockwise.
Figure 5F:
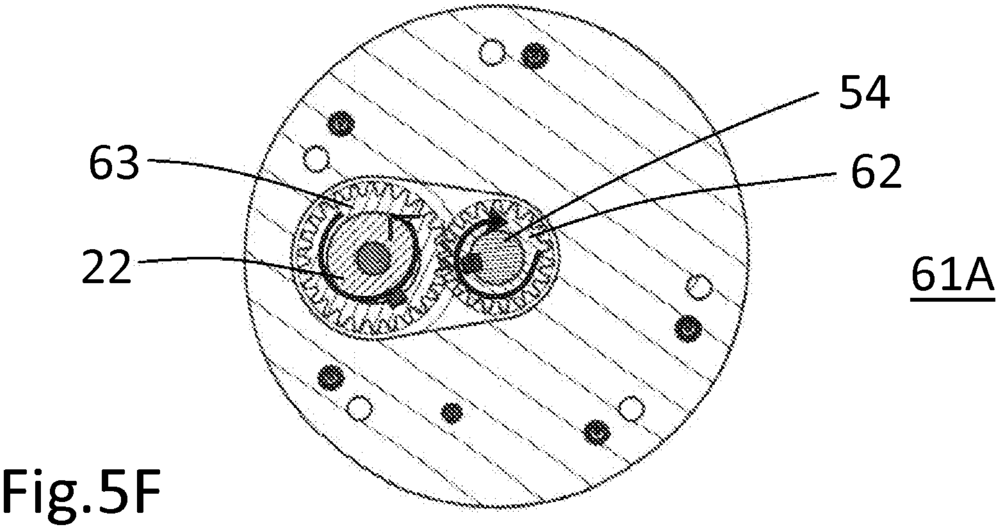
FIG. 5F is a schematic cross-sectional view taken along the section A7-A7 in FIG. 4B, showing a spur gear couple connected to the mid-wheel (intermediate ring) of the 2-speed torque hub, when the motor is turning clockwise.
Figure 5G:
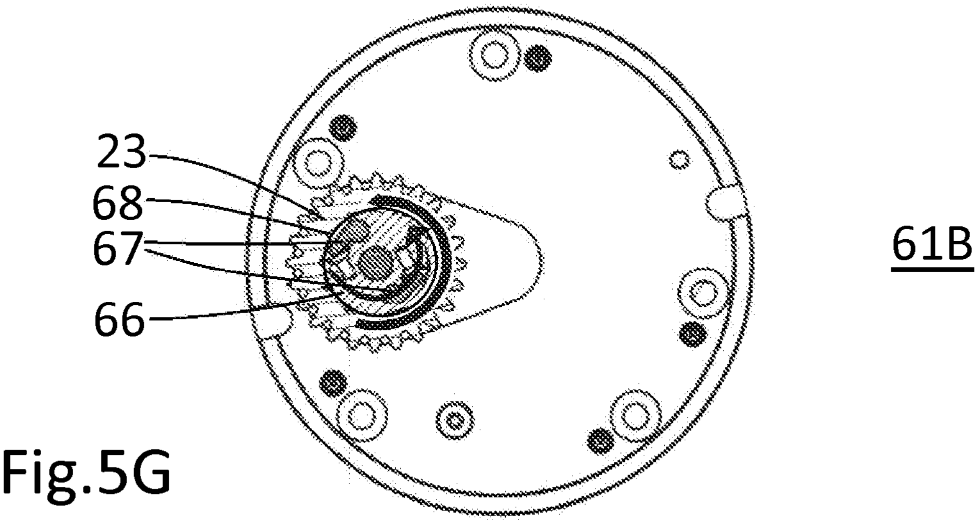
FIG. 5G is a schematic cross-sectional view taken along the section A8-A8 in FIG. 4B, showing an outgoing gear with a one-way locking mechanism comprising a ratchet mechanism, when the motor is turning clockwise.
Figure 6A:
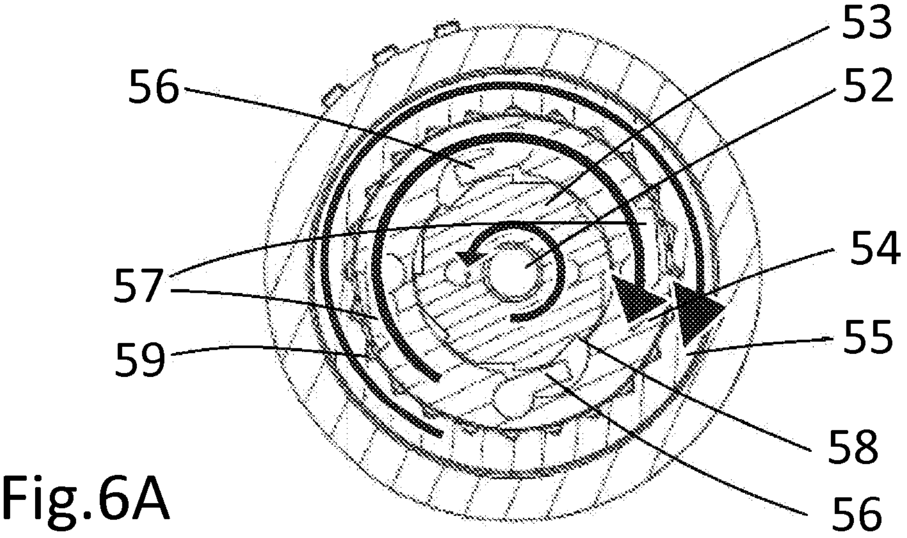
FIG. 6A is a schematic cross-sectional view taken along the section A6-A6 in FIG. 4B, showing the 2-way ratchet mechanism with a mid-wheel (intermediate ring) forming the outgoing shaft of the two-speed torque hub, when the motor is turning anti-clockwise.
Figure 6B:
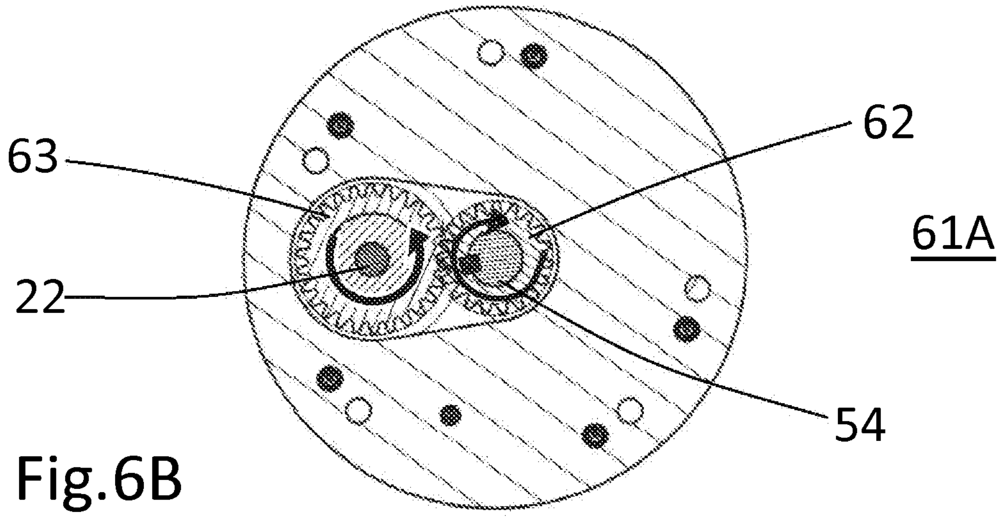
FIG. 6B is a schematic cross-sectional view taken along the section A7-A7 in FIG. 4B, showing the spur gear couple connected to the mid-wheel (intermediate ring) of the 2-speed torque hub, when the motor is turning anti-clockwise.
Figure 6C:
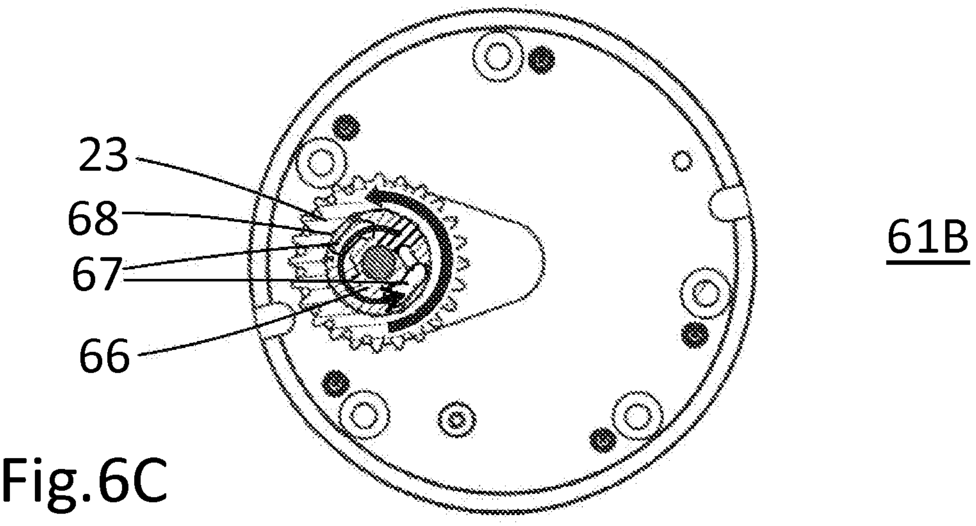
FIG. 6C is a schematic cross-sectional view taken along the section A8-A8 in FIG. 4B, showing an outgoing gear with a one-way locking mechanism comprising a ratchet mechanism, when the motor is turning anti-clockwise.

FIG. 4B is a cross-sectional view through the electric drive unit 20 taken along the section X-X in FIG. 4A schematically illustrating the transmission arrangement which here comprises a three-stage planetary gearbox here comprising a first planetary gear stage 24, a second planetary gear stage 31 and a third planetary gear stage 41 comprising a fixed planetary carrier and forming part of a two-speed torque hub 60 also comprising a 2-way ratchet mechanism and being connected to a spur gear couple 61A and an output gear 61B with an outer gear wheel, forming said outgoing shaft gear wheel 23, fitted onto a hub 66 which is driven by a spur gear wheel 63, and the ratchet mechanism comprising ratchet pawls 67 (see FIGS. 5G and 6C).

The drive unit 20 gear ratio is controlled by the rotational direction of the electric motor 21. Different scenarios depending on whether the motor is turning clockwise or anti-clockwise will be described through illustration of the sections A1-A1, A2-A2, A3-A3, A5-A5, A6-A6, A7-A7, A8-A8 in FIGS. 5A-6C below.

FIGS. 5A-5G shows the scenario when the motor is turning clockwise, and for the scenario when the motor is turning anti-clockwise, the rotational directions in the sections shown in FIGS. 5A-5D will be reversed; not shown, while the differences in the sections shown 5E-5G for the clockwise turning of the motor 21 are shown in FIGS. 6A-6C for the case when the motor 21 is turning anti-clockwise.

FIG. 5A is a cross-sectional view taken through the electric drive unit 20 along the line A1-A1 illustrating a scenario in which the electric motor 21 arranged in the motor housing 211 is turning clockwise at a rotational speed of N rpm (rotations per minute). In FIG. 5A are merely schematically illustrated power cables 221, exemplary cable supports 222 and motor fastening elements 221 which can be arranged and provided for in any appropriate manner FIG. 5B is a cross-sectional view taken through the electric drive unit 20 along the line A2-A2 in the scenario when the electric motor 21 is turning clockwise at a rotational speed of N rpm and illustrates the first planetary gear stage 24 of the three-stage planetary gearbox. The first planetary gear stage 24 comprises a first planetary gear wheel carrier 27 with a fixed ring gear 29, a first planetary gear stage sun wheel 26 and three first planetary gear stage planetary gear wheels 28, 28, 28. The motor shaft 25 and the to the motor shaft 25 connected sun gear wheel 26 with external gear teeth 261 hence turn clockwise at N rpm, sun gear wheel 26 external gear teeth 261 mesh with external gear teeth of the three first planetary gear stage planetary gear wheels 28, 28, 28, and the first planetary gear wheel carrier 27 will turn at a lower rotational speed, which speed will depend on the number and arrangement of gear teeth 261 and the external gear teeth of the three first planetary gear stage planetary gear wheels 28, 28, 28 and on the relations between the diameters of the first planetary gear stage planetary gear wheels 28, 28, 28 and the connected sun gear wheel 26. In an advantageous embodiment the first planetary gear wheel carrier 27 will rotate with a rotational speed of N/4.33. The invention is by no means limited to the first planetary gear wheel carrier 27 rotating with a rotational speed of N/4.33; on the contrary, the first planetary gear wheel carrier 27 may rotate with a lower as well as a higher rotational speed then N/4.33, but the rotational speed is lower than N; the FIG. 4.33 only being given for a particular embodiment, the figure depending on the selected gear design. The first and second planetary gear stages 24, 31 only serve the purpose of adapting speed and torque to a selected motor, particularly a selected electric motor, and depending on selected motor, more, less or no first and second planetary stages can be used. They can also be differently located in the transmission arrangement.

FIG. 5C is a cross-sectional view taken through the electric drive unit 20 along the line A3-A3 in the scenario when the electric motor 21 is turning clockwise at a rotational speed of N rpm and illustrates the second planetary gear stage 31 of the three-stage planetary gearbox. The second planetary gear 31 comprises a second planetary gear wheel carrier 33 with a fixed ring gear 29 (the fixed ring gear 29 is shared by the first planetary gear stage 24 and the second planetary gear stage 31), a second planetary gear stage sun wheel 32 and three second planetary gear wheels 34, 34, 34, the sun gear wheel 32 external gear teeth meshing with external gear teeth of the three second planetary gear stage planetary gear wheels 34, 34, 34. The second planetary gear stage sun wheel 32 is connected to the first planetary gear wheel carrier 27 (see FIG. 5B) turning clockwise at a lower rotational speed than the motor; in the exemplifying embodiment at N/4.33 rpm. The second planetary gear carrier wheel 33 will rotate at a lower speed, also depending on the diameters and the number of teeth as mentioned above with reference to the first planetary gear stage and as described with reference to FIG. 5B. In one embodiment the first and second planetary gears stages 24, 31 are similar. The second planetary gear wheel carrier 33 would then e.g. rotate at $N/4.33^2$ rpm, which as referred to above merely relates to one particular embodiment. The speed may be lower as well as higher but will be lower than the speed of the gear wheel carrier of the first planetary gear.

FIG. 5D is a cross-sectional view taken through the electric drive unit 20 along the line A5-A5 in the scenario when the electric motor 21 is turning clockwise at a rotational speed of N rpm and illustrates the (here) third planetary gear stage 41, the fixed planetary gear stage, of the planetary gearbox. The third, or fixed, planetary gear stage 41 comprises a third planetary gear stage sun wheel 42, a third planetary gear stage fixed gear carrier 43, three third planetary gear planetary wheels 44, 44, 44 and a ring gear 45 supported by roller bearing 46. The third planetary gear stage sun wheel 42 is connected to the second planetary gear stage planetary gear carrier 33 turning clockwise at a rotational speed of, here, e.g. $N/4.33^2$ rpm, and will also rotate clockwise at a rotational speed of, here, e.g. $N/4.33^2$ rpm. Since the third (here) planetary gear stage planetary gear carrier 43 is fixed, it will not rotate. Third planetary gear stage ring gear 45 will rotate anti-clockwise at, here, a speed of $(N/4.33^2)/3$ rpm. A roller bearing 46 is arranged between the ring gear 45 of the third planetary gear stage 41 and the transmission housing 212. The ring gear 45 and the sun gear 42 of the third planetary gear stage 41 will rotate in opposite directions, at different rotational speeds. Thus, the two gear speeds of the electric part of the winch arrangement are obtained.

With reference to FIGS. 5E-5F (cross-sections A6-A6-A7-A7 in FIG. 4B) a gear stage providing, or comprising, the function of a 2-speed torque hub 60 provided by means of the fixed third planetary gear stage carrier 43 (FIG. 5D) and a one-way locking mechanism (FIG. 5E), and with reference to FIG. 5F (cross-section A7-A7), the connection to a spur gear couple connecting to an outgoing gear with a one-way locking mechanism FIG. 5G (cross-section A8-A8) allowing engagement/disengagement of the electric drive unit, will be described when the motor 21 is turning clockwise.

FIG. 5E is a cross-sectional view taken through the electric drive unit 20 along the section A6-A6 in the scenario when the electric motor 21 is turning clockwise at a rotational speed of N rpm and illustrates a two-way ratcheting mechanism 51 of the 2-speed torque hub 60.

Torque hub center shaft 52 is connected to the third planetary gear stage sun wheel 42 which rotates clockwise at a rotational speed of, here, e.g. $N/4.33^2$ rpm, and thus the center shaft 52 will also rotate in the clockwise direction at, here, a rotational speed of $N/4.33^2$ rpm. An outer ring 55 of the two-way ratcheting mechanism 51 of the 2-speed torque hub 60 is connected to the ring gear 45 of the third planetary gear stage 41. As described with reference to FIG. 5D, the ring gear of the third planetary gear stage 41 rotates anti-clockwise at, here, a speed of $(N/4.33^2)/3$ rpm, and hence also the outer ring 55 of the two-way ratcheting mechanism 51 of the 2-speed torque hub 60 will rotate anti-clockwise at, here, a speed of $(N/4.33^2)/3$ rpm. The two-way ratcheting mechanism 51 of the 2-speed torque hub 60 also comprises an intermediate ring 54 which here engages with the center shaft 52 which (here) rotates clockwise at a rotational speed of $N/4.33^2$ rpm as explained below.

Between hub 53 connected to the center shaft 52 and the intermediate ring 54 a first torque hub 60 one-way locking mechanism 56, 58 e.g. comprising a number of pivotally arranged ratchet pawls 56 which in an engaged state engage with pawl locking seats or ratchet teeth 58 disposed at the outer periphery of the hub 53 connected to the center shaft 52, and are here in the locking or engaged mode, i.e. the ratchet pawls 56 are engaged in the pawl locking seats or ratchet teeth 58, and hence the center shaft 52 will be connected to the hub 53 and the intermediate ring 54 and they rotate in the same direction. The intermediate ring 54 will hence also rotate at a rotational speed of, here, $N/4.33^2$ rpm.

Between the outer ring 55 and the intermediate ring 54 a second torque hub 60 one-way locking mechanism 57, 59 e.g. comprising a number of pivotally arranged ratchet pawls 57 which in an engaged state engage with ratchet seats or ratchet teeth 59 disposed at the inner periphery of the outer ring 55, which in this case are in the unlocking mode, i.e. the ratchet pawls 57 are not engaged in the pawl locking seats or ratchet teeth 59 hence allowing the outer ring 55 and the intermediate ring 54 to rotate in different directions, i.e. the second torque hub one-way locking mechanism 57, 59 is in a released state.

The first and second torque hub 60 one-way locking mechanisms 56, 58; 57, 59 may hence both comprise pivotally arranged ratchet pawls 56; 57 arranged to engage in corresponding ratchet teeth or pawl locking seats 58; 59 on the outer periphery of the hub 53 connected to the center shaft 52 and the outer ring 55 respectively for one rotational direction respectively, and be released for rotation in the respective opposite direction in a manner known per se. Also, other alternative one-way locking mechanisms than ratchet pawl mechanisms may be used for the one or the other or for both.

The center shaft 52 and the intermediate ring 54 will rotate with a higher speed, $N/4.33^2$, and will rotate in the same direction, and the intermediate ring 54 and the outer ring 55 will rotate in different directions. The outer ring 55 will rotate at the lower speed, here $(N/4.33^2)/3$.

FIG. 5F is a cross-sectional view taken through the electric drive unit 20 along the line A7-A7 in the scenario when the electric motor 21 is turning clockwise at a rotational speed of N rpm and illustrates a spur gear couple 62, 63 connecting to the two-way ratcheting mechanism 51 of the 2-speed torque hub 60.

A first spur gear wheel 62, fixedly connected to the intermediate ring 54 (see FIG. 5E), will hence also rotate at a rotational speed of, here, e.g. $N/4.33^2$ rpm.

A second spur gear wheel 63 is arranged such that outer teeth of the second spur gear wheel 63 will engage with outer teeth of the first spur gear wheel 62, and the second spur gear wheel 63 will rotate in the opposite direction, anti-clockwise.

FIG. 5G is a cross-sectional view taken through the electric drive unit 20 along the line A8-A8 in the scenario when the electric motor 21 is turning clockwise at a rotational speed of N rpm and illustrates an output gear 61B connecting to spur gear couple 61A.

An output (outgoing) gear 61B hub 66 is connected to the second spur gear wheel 63 rotating anti-clockwise (FIG. 5F) and the output gear hub 66 will hence also rotate anti-clockwise. The output gear outer wheel forms the outgoing shaft gear wheel 23 of the electric drive unit as referred to earlier in the application (see FIG. 4) and is connected to the output gear hub 66 by means of an output gear one-way locking mechanism 67, 68, here in a locked position, such that the outgoing shaft gear wheel 23 also will rotate anti-clockwise. The output gear 61B one-way locking mechanism 67, 68 here comprises ratchet pawls 67 pivotally mounted on the outer part of the output gear hub 66 and ratchet teeth or pawl locking seats 68 provided at the inner part of the outgoing shaft gear wheel 23 in which the ratchet pawls 67 engage in an engaged, connected, mode, and from which the ratchet pawls 67 are released in a free mode, allowing the winch drum 1 to rotate in the opposite direction, here clockwise, i.e. disengaged from the electric drive unit when operated manually with the manual winch 10 by means of the winch handle or winch crank, or is rotated by means of a rope pulled over the winch drum 1.

With reference to FIGS. 6A-6B (cross-sections A6-A6-A7-A7 in FIG. 4B) a gear stage providing, or comprising, the function of the 2-speed torque hub 60 provided by means of the fixed third planetary gear stage planetary gear carrier 43 and the one-way locking mechanisms 56, 58; 57, 59, and with reference to FIG. 6B (cross-section A7-A7), the connection to spur gear couple 61A connecting to the outgoing gear 61B with the one-way locking mechanism 67, 68 with reference to FIG. 6C (cross-section A8-A8) allowing engagement/disengagement of the electric drive unit, will be described when the electric motor 21 is turning anti-clockwise. Thus, FIGS. 6A-6C show the sections A6-A6, A7-A7, A8-A8 for the scenario when the motor is turning anti-clockwise. As referred to above, the rotational directions in the sections shown in FIGS. 5A-5D (sections A1-A1, A2-A2, A3-A3, A5-A5) will be reversed and the illustrated elements are not otherwise affected, and these sections are therefore not shown for the case when the motor is turning anti-clockwise.

FIG. 6A is a cross-sectional view taken through the electric drive unit 20 along the line A6-A6 in the scenario when the electric motor 21 is turning anti-clockwise at a rotational speed of N rpm and illustrates the two-way ratcheting mechanism 51 of the 2-speed torque hub 60.

The center shaft 52, connected to the third planetary gear stage sun wheel 42, which now rotates anti-clockwise at a rotational speed of, here, e.g. $N/4.33^2$ rpm, also rotates in the anti-clockwise direction at, here, a rotational speed of $N/4.33^2$ rpm. Outer ring 55 of the two-way ratcheting mechanism 51 of the 2-speed torque hub 60, which is connected to the ring gear 45 of the third planetary gear stage 41, which here rotates clockwise at a speed of $(N/4.33^2)/3$ rpm, will also rotate in the clockwise direction at, here, a speed of $(N/4.33^2)/3$ rpm. The intermediate ring 54 of the two-way ratcheting mechanism 51 of the 2-speed torque hub 60 is disengaged from the center shaft 52 since the first torque hub one-way locking mechanism 56, 58 is in a disengaged mode, e.g. through the ratchet pawls 56 being pivoted and disengaged from the pawl locking seats or ratchet teeth 58. The intermediate ring 54 will instead engage with the outer ring 55 rotating clockwise at a rotational speed of, here, e.g. $(N/4.33^2)/3$ rpm, and will hence also rotate clockwise at a rotational speed of $N/4.33^2$ rpm by means of the second torque hub one-way locking mechanism 57, 59 by means of the ratchet pawls 57 being engaged with the pawl locking seats or ratchet teeth 59.

Thus, the center shaft 52 will rotate at a higher speed, $N/4.33^2$, and the center shaft 52 and the intermediate ring 54 will rotate in different directions. The outer ring 55 and the intermediate ring 54 will rotate in the same direction at a lower speed, $(N/4.33^2)/3$.

FIG. 6B is a cross-sectional view taken through the electric drive unit 20 along the line A7-A7 in the scenario when the electric motor 21 is turning anti-clockwise at a rotational speed of N rpm and illustrates the spur gear couple 61A of the 2-speed torque hub 60.

The first spur gear wheel 62, fixedly connected to the intermediate ring 54 (see FIG. 6A) rotating clockwise at the lower speed $(N/4.33^2)/3$ and will hence also rotate at the lower rotational speed of, here, $(N/4.33^2)/3$ rpm, i.e. in the same direction as when the electric motor 21 is turning clockwise, but at a lower speed, here one third of the speed when the electric motor 21 is running clockwise.

The second spur gear wheel 63, the outer teeth of which engage with outer teeth of the first spur gear wheel 62, will rotate in the opposite direction, anti-clockwise.

FIG. 6C is a cross-sectional view taken through the electric drive unit 20 along the line A8-A8 in the scenario when the electric motor 21 is turning anti-clockwise at a rotational speed of N rpm and illustrates the output gear 61B of the 2-speed torque hub 60.

Output gear 61B hub 66 is connected to the second spur gear wheel 63 rotating anti-clockwise (FIG. 6B) and the output gear 61B hub 66 will hence also rotate anti-clockwise. The output gear 61B outer wheel forms the outgoing shaft gear wheel 23 of the electric drive unit 20 (see FIG. 4) as referred to with reference to FIG. 5G and is connected to the output gear hub 66 by means of the output gear one-way locking mechanism 67, which here is in an engaged mode, a locked position, such that the outgoing shaft gear wheel 23 also will rotate anti-clockwise, but in this scenario, when the electric motor 21 is turning anti-clockwise, at the lower speed which here is one third of the speed when the electric motor 21 is turning clockwise, and with a torque which here is three times the torque when the electric motor 21 is turning clockwise.

Thus, depending on the mechanical gears of the transmission and rotational direction of the electric motor 21, the outgoing shaft gear wheel 23 received in the manual winch 10 will rotate with different speeds.

In the particularly illustrated embodiment, when the electric motor 21 is turning clockwise at a rotational speed of N rpm, the outgoing shaft gear wheel 23 is rotating anti-clockwise at a first, higher, speed of, here, $N/4.33^2$, whereas when the electric motor 21 is turning anti-clockwise at a rotational speed of N rpm, the outgoing shaft gear wheel 23 is rotating anti-clockwise at a second, lower, speed of, here, $(N/4.33^2)/3$. Thus, the total gear ratio for running the electric motor 21 in the two opposite directions is here 3.

It should however be clear that the higher and lower speed respectively can be reversed; i.e. a higher speed for anti-clockwise turning of the electric motor and vice versa. Further, the specific FIG. 3 and 4.33 merely are given for exemplifying reasons. The exact figures can be selected to be any other appropriate figures, and depend on gear designs, dimensions such as diameters, number of gear teeth etc.

It should further be clear that the number of planetary gear stages of the planetary gearbox of the electric drive unit 20 can be different. The first and second planetary gear stages may be located elsewhere, and even replaced by e.g. an electric motor having a higher power, since they serve the purpose of increasing the gear ratio. In one embodiment (not shown) the first and second planetary gear stages are located after the 2-speed torque hub 60, i.e. towards the manual winch between sections A6-A6 and A8-A8 or they may even be disposed of in another, not shown embodiment as referred to above.

Also the manual winch may be of different types as long as it allows mounting of a drive unit, particularly an electric drive unit 20 as described, allowing the outgoing shaft 22 of the drive unit 21 to be received in an opening 122 in the bottom 9 of the manual winch 10 as discussed above.

The motor may e.g. be a step motor, a brushless DC motor and preferably electrically controllable by means of an electric control unit CU. Most preferably the motor is a small high-speed motor. Alternatively, it may be a low-speed DC motor or a hydraulic motor.

The one-way locking mechanisms do not have to comprise ratchet mechanisms but can be of different types, e.g. any type of freewheel mechanisms etc. Different one-way locking mechanisms at different locations may also be used in the winch arrangement. If ratchet mechanisms are used, the ratchet pawls may be spring loaded by means of coil springs into engagement/disengagement mode.

Through the invention a 2-speed compact planetary gearbox in the electric drive unit which in turn is connected to a manual winch in such a way that the winch handle can be kept in the winch when using the electric motor is provided, which is extremely advantageous. This allows independent use of the winch either manually at 2-speed function, or as electric drive at 2-speed function without any interference between manual and the driven operation. The electric drive unit requires very limited space through the manner it is connected to the manual winch, under the manual winch, which is another important advantage compared to the often very large drive units including worm gears used on many electric sailboat winches.

It is an advantage of the invention that a conventional manual 2-speed winch easily can be updated to a two-speed manual and a two-speed electric winch through connection of the electric drive unit below the manual winch.

It should be clear that the invention is not limited to the explicitly described embodiments but that it can be varied in several ways within the scope of the appended claims. The arrangement is particularly intended for use on a boat, particularly a leisure sailing boat.

Although the inventive concept has been described with reference to a winch arrangement it should be clear that it is also applicable for other applications of winding arrangements, particularly when a high torque at low speed and a low torque at high speed is required, such as a furler unit for a sail, a windlass or a captive reel winch, allowing operation either as a manual winding arrangement or as a two speed motor driven winding arrangement.

It should also be clear that the content of described embodiments freely can be varied and combined.

The invention claimed is:

1. A winding arrangement for a sailing boat comprising:

a winding member comprising a rotatable winding drum configured to be driven by a handle or crank via a transmission mechanism, wherein the handle or crank can be turned to rotate the winding drum with at least one rotational speed;

a drive unit comprising a motor configured to drive the winding drum, wherein the drive unit comprises a transmission arrangement comprising mechanical gears connected to a motor shaft of the motor, an outgoing shaft and an outgoing shaft outer gear wheel, and the transmission arrangement is adapted to allow the outgoing shaft gear wheel to rotate in a first direction but at different rotational speeds, and torques, depending on the rotational direction of the motor;

the winding member is adapted to allow mounting of the drive unit and comprises a mount for reception of the outgoing shaft of the drive unit allowing the winding drum to be driven by the motor by the outgoing shaft gear wheel engaging, directly or indirectly, with a gear wheel of the transmission mechanism of the winding member that can be rotatably engaged with, and disengaged from, the winding drum, the drive unit transmission arrangement is configured to allow engagement/disengagement of the drive unit outgoing shaft gear wheel from the winding member;

the winding arrangement independently can be used either as a manual winding arrangement or as a two speed motor driven winding arrangement;

wherein a first planetary gear stage comprises:

a first planetary gear wheel carrier, with a fixed ring gear, a first planetary gear stage sun wheel, and three first planetary gear stage planetary gear wheels, the motor comprises the motor shaft to which the first planetary gear stage sun wheel is connected, the first planetary gear stage sun wheel comprises external gear teeth which are arranged to mesh with external gear teeth of the three first planetary gear stage planetary gear wheels such that the first planetary gear wheel carrier, upon rotation of the motor, will rotate at a first rotational speed, said first rotational speed depending on the number of external gear teeth of the first planetary gear stage sun wheel and of the three first planetary gear stage planetary gear wheels and on the dimensions of the motor shaft sun wheel and of the three first planetary gear stage planetary gear wheels, a second planetary gear stage comprises:

a second planetary gear wheel carrier, the fixed ring gear which is shared with the first planetary gear stage, a second planetary gear stage sun wheel, and three second planetary gear stage planetary gear wheels, wherein the sun gear wheel teeth mesh with external gear teeth of the three second planetary gear stage planetary gear wheels, and the second planetary gear stage sun wheel being connected to the first planetary gear wheel carrier such that the second planetary gear wheel carrier, upon rotation of the motor, will rotate at a second rotational speed which is lower than the first rotational speed of the first planetary gear wheel carrier.

2. The winding arrangement according to claim 1, wherein the first planetary gear stage and the second planetary gear stages are located between a third planetary gear stage and the motor.

3. The winding arrangement according to claim 2, wherein the drive unit comprises an electric drive unit driven by an electric motor.

4. The winding arrangement according to claim 3, wherein the electric motor is controllable by an electric control unit.

5. The winding arrangement according to claim 3, wherein the electric motor comprises a step motor or a brushless DC motor.

6. The winding arrangement according to claim 3, wherein the electric motor comprises a DC motor.

7. The winding arrangement according to claim 1, wherein the first planetary gear stage and the second planetary gear stages are located between a two-speed torque hub and a spur gear couple.

8. The winding arrangement according to claim 7, wherein the drive unit comprises an electric drive unit driven by an electric motor.

9. The winding arrangement according to claim 8, wherein the electric motor is controllable by an electric control unit.

10. The winding arrangement according to claim 8, wherein the drive unit comprises an electric drive unit driven by an electric motor, and the electric motor comprises a step motor or a brushless DC motor.

11. The winding arrangement-according to claim 8, wherein the electric motor comprises a DC motor.

12. The winding arrangement according to claim 1, wherein the drive unit comprises a hydraulic motor.

13. The winding arrangement according to claim 1, further comprising a winch arrangement, the winding member comprising a two speed manually operable winch, the winding drum comprising a winch drum.

14. The winding arrangement according to claim 13, wherein the two speed manually winch arrangement allowing the rotating winding drum comprising the winch drum to be driven by the transmission in a direction such that when the handle or crank is turned in a first direction the winch drum will rotate at a first rotational speed and when the handle or crank is turned in a second direction, the winch drum will rotate at a second speed such that the winch arrangement independently can be used either as a two-speed manual winch or as a two-speed motor driven winch.

15. A winding arrangement for a sailing boat comprising:

a winding member comprising a rotatable winding drum configured to be driven by a handle or crank via a transmission mechanism, wherein the handle or crank can be turned to rotate the winding drum with at least one rotational speed;

a drive unit transmission comprising a motor configured to drive the winding drum, wherein the drive unit comprises a transmission arrangement comprising mechanical gears connected to a motor shaft of the motor, an outgoing shaft and an outgoing shaft outer gear wheel;

the winding member is adapted to allow mounting of the drive unit and comprises a mount for reception of the outgoing shaft of the drive unit allowing the winding drum to be driven by the motor by the outgoing shaft gear wheel engaging, directly or indirectly, with a gear wheel of the transmission mechanism of the winding member that can be rotatably engaged with, and disengaged from, the winding drum;

the drive unit transmission arrangement is configured to allow engagement/disengagement of the drive unit outgoing shaft gear wheel from the winding member;

the winding arrangement independently can be used either as a manual winding arrangement or as a two speed motor driven winding arrangement;

wherein the mount comprises a shaft hole or opening in a bottom portion of the winding member adapted for reception of the outgoing shaft of the drive unit, the drive unit being mountable under the winding member;

wherein the drive unit comprising the drive unit transmission arrangement comprising a gear stage comprising a two-speed torque hub comprising a spur gear couple and output or outgoing gear hub connected to the spur gear couple, and the drive unit transmission arrangement comprises an output gear one-way locking mechanism when in an engaged, connected, mode, the outgoing, output, shaft gear wheel is connected to the output or outgoing hub allowing the winding drum to be operated by the motor, and in a disengaged, unconnected, mode is disconnected from the outgoing, output, shaft gear wheel, allowing manual operation by the handle or crank or rotation of the winding drum by a rope pulled over the winding drum;

wherein when output gear one-way locking mechanism is in the engaged, connected, mode in which the outgoing output shaft gear wheel is connected to the output gear hub, and the motor is turning in a first rotational direction at a first rotational speed, N rpm, the outgoing shaft gear wheel will rotate in an opposite direction at a first outgoing shaft gear wheel speed, whereas when the motor is turning in a second rotational direction opposite to said first rotational direction, at the first rotational speed, N rpm, the outgoing shaft gear wheel will rotate in the same direction as the motor, at a second outgoing shaft gear wheel speed, the first outgoing shaft gear wheel speed is higher than the second outgoing shaft gear wheel speed, the relation between the first and the second outgoing shaft gear wheel speeds depending on a gear ratio provided by gear stages of the transmission arrangement;

wherein the two-speed torque hub is formed by a fixed planetary gear stage carrier of a fixed carrier planetary gear stage of a planetary gearbox, the spur gear couple and first and second torque hub one-way locking mechanisms; and wherein the fixed carrier planetary gear stage comprising the fixed planetary gear stage carrier comprises a planetary gear stage sun wheel, planetary gear wheels and a ring gear, so arranged that when the planetary gear stage sun wheel rotates, the ring gear will rotate in the opposite direction at a lower speed, the fixed carrier planetary gear stage of the planetary gearbox thus being adapted to enable the two output gear speeds of the drive unit when the winding arrangement is driven by the drive unit.

16. The winding arrangement according to claim 15, wherein the planetary gear stage sun wheel is connected to the torque hub center shaft, the torque hub comprises a two-way ratcheting mechanism comprising an outer ring connected to the ring gear of the fixed carrier planetary gear stage and an intermediate ring provided between a hub connected to the center shaft and the outer ring, the torque hub comprises a first torque hub one-way locking mechanism provided between the hub connected to the center shaft and the intermediate ring such that when the first torque hub one-way locking mechanism is in a locked mode, the center shaft and the intermediate ring will rotate in the same direction, whereas in an unlocked mode, the center shaft and the intermediate ring will rotate in different directions, and a second torque hub one-way locking mechanism provided between the outer ring and the intermediate ring, such that when the second torque hub one-way locking mechanism is in an unlocked mode, the intermediate ring and the outer ring are allowed to rotate in different directions whereas in the locked mode the center shaft and the intermediate ring will rotate in the same direction.

17. The winding arrangement according to claim 16, wherein the spur gear couple comprises a first spur gear wheel with outer teeth and which is fixedly connected to the intermediate ring and a second spur gear wheel with outer teeth which, wherein the first and second spur gear wheels are arranged in parallel, the outer teeth of the first spur gear wheel being in engagement with the outer teeth of the second spur gear wheel and, independently of whether the motor rotates in a first or a second rotational direction the first spur gear wheel will rotate in the same direction and the second, spur gear wheel will rotate in the direction opposite to the direction in which the first spur gear wheel rotates, and the first spur gear wheel fixedly connected to the intermediate ring will rotate at the same speed as the intermediate ring, and, if the intermediate ring is disconnected from the outer ring and connected to the center shaft, and rotating with the higher speed, also the first spur gear wheel will rotate with the higher speed, if the intermediate ring is connected to, engaged with, the outer ring and disconnected from the center shaft, and rotating with the lower speed, also the first spur gear wheel will rotate with the lower speed.

18. The winding arrangement according to claim 17, wherein the second spur gear wheel is connected to the output gear hub comprising output gear comprising the outer gear wheel forming the outgoing shaft gear wheel, which is releasably connectable to the output gear hub by the output gear one-way locking mechanism, and independently of the rotation direction of the motor, the outgoing shaft gear wheel will rotate in one and the same direction, but with different rotational speeds depending on the rotational speed of the second spur gear wheel.

19. The winding arrangement according to claim 15, wherein the transmission arrangement of the drive unit comprises a three-stage planetary gear box comprising three planetary gear stages, first and second planetary gear stages serving the purpose of increasing the gear ratio, the power provided by the motor via the motor shaft and via the transmission arrangement on the outgoing shaft, and a third, fixed carrier planetary gear stage enabling the two output gear speeds of the drive unit when the winding arrangement is driven by the drive unit.

20. The winding arrangement according to claim 15, further comprising a furler arrangement for a sail, a windlass or a captive reel winch.

21. The winding arrangement according to claim 20, wherein the winding arrangement is operable independently both as a one-speed manual winding arrangement or as a two-speed motor driven winding arrangement or the winding arrangement is operable independently both as a two-speed manual winding arrangement or as a two-speed motor driven winding arrangement.

* * * * *